United States Patent [19]

Iwatani

[11] Patent Number: 5,260,641

[45] Date of Patent: Nov. 9, 1993

[54] CONTROL APPARATUS FOR AN AC GENERATOR

[75] Inventor: Shiro Iwatani, Himeji, Japan

[73] Assignee: Mitsubishi Denki Kabushiki Kaisha, Tokyo, Japan

[21] Appl. No.: 709,844

[22] Filed: Jun. 4, 1991

[30] Foreign Application Priority Data

Jun. 18, 1990 [JP] Japan ................... 2-157481

[51] Int. Cl.⁵ .................. H02H 7/06; H02P 9/00; H02P 11/00
[52] U.S. Cl. .................................... 322/28
[58] Field of Search .............. 322/72, 73, 28; 320/69, 320/64

[56] References Cited

U.S. PATENT DOCUMENTS

| | | | |
|---|---|---|---|
| 4,266,181 | 5/1981 | Muto et al. | 322/28 |
| 4,295,087 | 10/1981 | Morishita et al. | 320/64 X |
| 4,739,244 | 4/1988 | Komurasaki et al. | |
| 4,985,670 | 1/1991 | Kaneyuki et al. | 322/28 |

FOREIGN PATENT DOCUMENTS

| | | |
|---|---|---|
| 1903787 | 9/1969 | Fed. Rep. of Germany . |
| 2725785 | 12/1977 | Fed. Rep. of Germany . |
| 2915068 | 10/1979 | Fed. Rep. of Germany . |
| 140112 | of 1979 | Japan . |

Primary Examiner—Steven L. Stephan
Assistant Examiner—E. To
Attorney, Agent, or Firm—Sughrue, Mion, Zinn, Macpeak and Seas

[57] ABSTRACT

A control apparatus for an AC generator which effectively prevents a dead battery even if the engine is stopped for an extended period of time with the key switch left on comprises a voltage regulator connected between the generator and the battery for controlling the current supply from the battery to the generator field coil. The voltage regulator comprises a first circuit including a semiconductor switch 306a connected in series with the field coil between an output and a ground terminal of the rectifier, a second circuit 303a, 304a connected between the first circuit and the rectifier for controlling the first circuit so that the output voltage of the generator is regulated to be at a first predetermined level, a third circuit 313a, 314a connected between the first circuit and the battery for making the first circuit conductive when the output voltage of the battery falls below a second predetermined level, and a fourth circuit 318a, 319a, 320a connected between the generator and the first circuit for making the first circuit conductive when the generator starts power generation.

7 Claims, 2 Drawing Sheets

CONTROL APPARATUS FOR AN AC GENERATOR

BACKGROUND OF THE INVENTION

The present invention relates to a control apparatus for an AC generator, and more particularly, to a control apparatus for a vehicular AC generator which cuts off a field current when the generator stops its operation or when a signal in the form of a current from the generator is stopped.

A typical example of an AC generator having a known control apparatus is illustrated in FIG. 2. In this figure, an AC generator in the form of a vehicular AC generator, generally designated by reference numeral 1, includes an armature coil 101 in the form of a three phase armature coil comprising three coil elements arranged in a star-like manner and connected to each other at one end, and a field coil 102.

A rectifier in the form of a full-wave rectifier, generally designated by reference numeral 2, is connected to the armature coil for rectifying the output thereof. The full-wave rectifier 2 has an output terminal 201, a ground terminal 202 connected to ground, and three input terminals 203 each connected to the other end of a corresponding coil element of the armature coil 1. The full-wave rectifier 2 also includes three pairs of rectifying diodes, each pair comprising two diodes serially connected to each other at a junction or input terminal 203. The three pairs of serially connected diodes are connected in a parallel relation with each other at their opposite ends to the common output terminal 201 and the ground terminal 202, respectively.

A voltage regulator, generally designated by reference numeral 3, is connected to the field coil 102 of the AC generator 1 and to the output terminal 201 of the rectifier 2. The voltage regulator 3 includes a pair of voltage dividing resistors 301, 302 serially connected to each other between the output terminal 201 of the rectifier 2 and ground, a Zener diode 303 having a cathode connected to a junction between the resistors 301, 302, a control transistor 304 having a base connected to an anode of the Zener diode 303 and an emitter connected to ground, a base-current supplying resistor 305 having one end thereof connected to a collector of the transistor 304, a switch 306 in the form of a power transistor having a base connected to a junction between the collector of the control transistor 304 and the base-current supplying resistor 305, an emitter connected to ground and a collector connected to the output terminal 201 of the rectifier 2 through the field coil 102 of the AC generator 1, and a suppression diode 307 having a cathode connected to the collector of the power transistor 306 and an anode connected to the output terminal 201 of the rectifier 2.

A storage battery 4 is connected between the output terminal 201 of the rectifier 2 and ground. The storage battery 4 is also connected at a positive terminal or electrode thereof through a key switch 5 to the other end of the base-current supplying resistor 305 of the voltage regulator 3 and directly to one end of the voltage dividing resistor 301.

A starter switch 6 and a starter 7 in the form of a motor, which are series connected to each other, are connected between the positive and negative electrodes of the storage battery 4.

In this connection, the rectifier 2, the voltage regulator 3, the storage battery 4, the key switch 5, the starter switch 6 and the starter 7 constitute a known control apparatus.

In operation, when the key switch 5 is first turned on, the storage battery 4 does not have sufficiently high voltage to make the Zener diode 303 conductive, so the control transistor 304 is non-conductive or turned off. Thus, at this time, a current begins to flow from the storage battery 4 to the base of the power transistor 306 through the base-current supplying resistor 305, making the transistor 306 conductive. As a result, a current is supplied from the storage battery 4 to the field coil 102 of the AC generator 1 by way of the now conductive power transistor 306. Subsequently, when the starter switch 6 is turned on, the starter 7 is energized by the storage battery 4 to start rotation, whereby an unillustrated engine operatively connected to the starter 7 is started. With the start of the engine operation, the AC generator 1 is driven to rotate by the engine so that it begins to generate electrical power. However, as long as the output power of the AC generator 1 is less than a predetermined level, both the Zener diode 303 and the control transistor 304 remain non-conductive, so the power transistor 306 continues to be held conductive. Accordingly, the field current supplied from the battery 4 to the field coil 102 increases, raising the output voltage of the AC generator 1. When the generator output voltage exceeds a predetermined level, the Zener diode 303 becomes conductive so that a current is supplied from the battery 4 to the base of the control transistor 304 through the now conductive Zener diode 303. As a result, the control transistor 304 is turned on and hence the current supply from the battery 4 to the base of the power transistor 306 is stopped, thus turning it off. Consequently, the current supply to the field coil 102 decreases to reduce the output power of the generator 1. With a repetition of the above operations, the output voltage of the generator 1 is regulated to a prescribed value under the action of the voltage regulator 3.

With the known control apparatus as constructed above, however, in the event that the engine is stopped for an extended period of time with the key switch 5 left on, or in the case that the engine stops for some reason during operation of the vehicle and the vehicle is left in that state, the storage battery 4 continues to supply a field current to the field coil 102 while there is no output voltage produced by the generator 1. Thus, due to the continued discharge, the battery 4 at last discharges to result in a so-called dead battery. Moreover, with a control apparatus of the type in which heat generation of the voltage regulator 3 is cooled by streams of air which are generated by a fan driven by the generator 1, there will be no cooling air provided by the fan when the generator 1 is stopped. As a result, the temperature of the voltage regulator 3 rises abnormally, causing thermal damage thereto.

SUMMARY OF THE INVENTION

Accordingly, the present invention is intended to obviate the above described problems encountered with the known generator control apparatus.

An object of the present invention is to provide a novel and improved control apparatus for an AC generator which can effectively prevent a dead battery even if an engine for driving the generator is stopped for an extended period of time.

Another object of the present invention is to provide a novel and improved control apparatus for an AC generator which can effectively prevent a voltage regulator from being thermally damaged even if the generator is stopped.

In other to achieve the above objects, according to the present invention, there is provided a control apparatus for an AC generator comprising:
- a rectifier connected to the generator for rectifying the output voltage thereof, the rectifier having input terminals connected to the armature coil, a ground terminal connected to ground, and an output terminal;
- a storage battery connected to the field coil of the generator for supplying a current to the field coil, the battery being also connected through the rectifier to the armature coil of the generator so as to be charged by the generator through the rectifier; and
- a voltage regulator connected between the generator and the battery for controlling the current supply from the battery to the field coil;

the voltage regulator comprising:
- first means including a switch connected in series to the field coil between the output and ground terminals of the rectifier for controlling the current supply from the battery to the field coil;
- second means connected between the first means and the rectifier for controlling the first means so that the output voltage of the generator is regulated to be at a first predetermined level;
- third means connected between the first means and the battery for making the first means conductive when the output voltage of the battery falls below a second predetermined level; and
- fourth means connected between the generator and the first means for making the first means conductive when the generator starts power generation.

A starter is connected through a starter switch to said battery for starting an engine which is operatively connected with the starter and which drives the generator.

According to the present invention, when the switch in the form of a key switch alone is turned on, the first means remains non-conductive and cuts off the current supply from the battery to the field coil of the generator. Subsequently, when the starter switch is turned on while the key switch is held on, the engine and hence the generator are started to operate. Thus, the generator generates an output which is supplied to the fourth means so that the first means is made conductive under the action of the fourth means. As a result, the battery begins to supply a current to the field coil through the now conductive first means. On the other hand, when the engine stops operation, the generator also stops power generation. This causes the fourth means to make the first means non-conductive, thus cutting off the field current supplied to the field coil.

The above and other objects, features and advantages of the present invention will become more readily apparent from the following detailed description of a preferred embodiment of the invention taken in conjunction with the accompanying drawings.

BRIEF DESCRIPTION OF THE DRAWINGS

In the drawings, the same or corresponding parts are identified by the same symbols.

DETAILED DESCRIPTION OF THE PREFERRED EMBODIMENT

A preferred embodiment of the present invention will now be described in detail while referring to the accompanying drawings.

Figure 1:
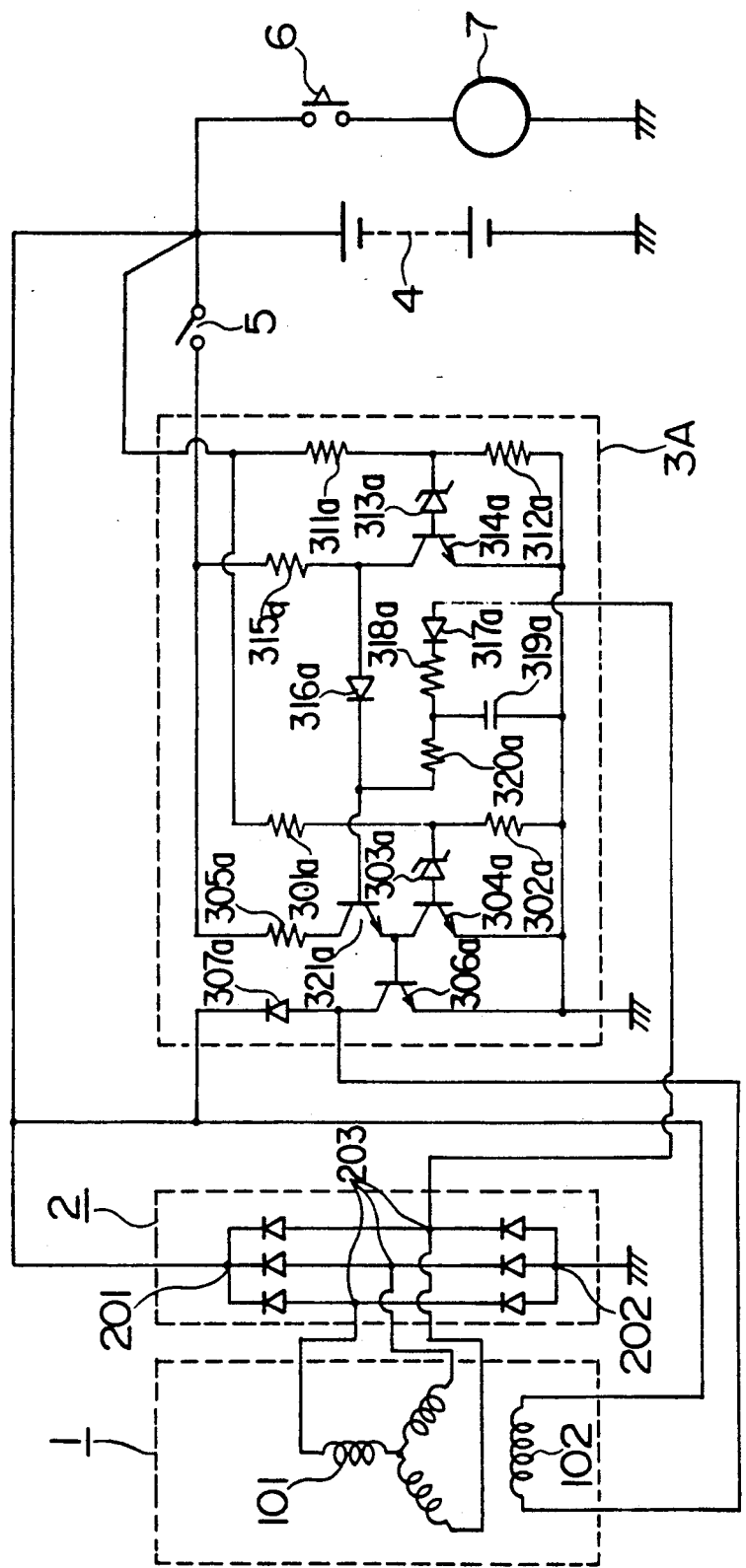
FIG. 1 is a block diagram of a control apparatus for an AC generator in accordance with the present invention.
Figure 2:
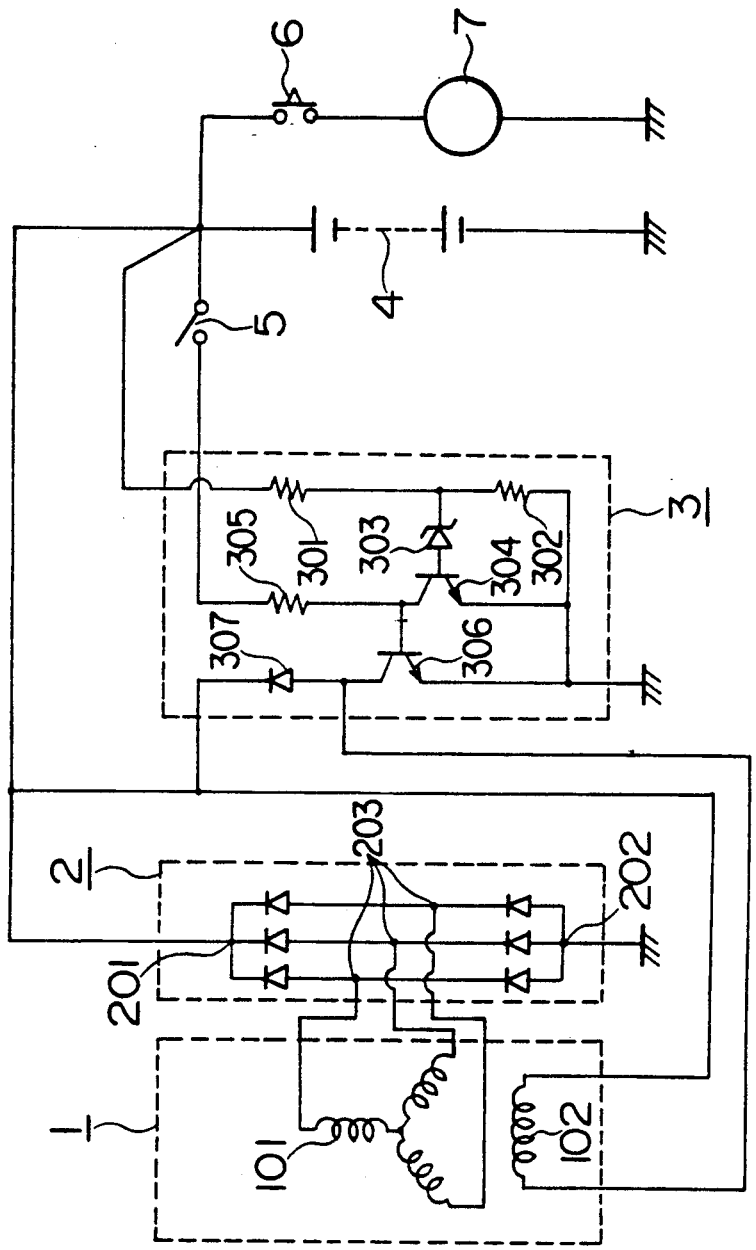
FIG. 2 is a block diagram of a known control apparatus for an AC generator.

FIG. 1 shows an AC generator 1 equipped with a control apparatus which is constructed in accordance with the present invention. The AC generator 1 is in the form of a three-phase AC generator having an armature coil 101 and a field coil 102, as in the generator 1 of FIG. 2. The control apparatus of the invention includes a rectifier 2 in the form of a full-wave rectifier, a storage battery 4, a key switch 5, a starter switch 6 and a starter 7 in the form of a motor, all of which are similar in construction and operation to the corresponding elements 1, 2 and 4 through 7 of the aforementioned control apparatus of FIG. 2. In addition to these elements, the control apparatus of the invention includes a voltage regulator 3A which is different in construction and operation from the voltage regulator 3 of FIG. 2.

Specifically, the voltage regulator 3A of the invention is constructed as follows. It includes a pair of generator-voltage detecting voltage-dividing resistors 301a, 302a, a first Zener diode 303a, a first control transistor 304a, a first base-current supplying resistor 305a, a switch 306a in the form of a power transistor, and a suppression diode 307a, which are the same as, and connected substantially in the same manner as, the corresponding elements 301 through 307 of FIG. 2. Other than these elements, the voltage regulator 3A further includes a pair of battery-voltage detecting voltage-dividing resistors 311a, 312a which are series connected to each other and which are connected in parallel to the serially connected voltage dividing resistors 301a, 302a, a second Zener diode 313a having a cathode connected to a junction between the voltage dividing resistors 311a, 312a, a second control transistor 314a having a base connected to an anode of the second Zener diode 313a and an emitter connected to ground, a second base-current supplying resistor 315a connected between the key switch 5 and a collector of the second control transistor 314a, a first reverse-current checking diode 316a having an anode connected to the collector of the second control transistor 314a, a second reverse-current checking diode 317a having an anode connected to any one of the input terminals 203 of the rectifier 2, a first smoothing resistor 318a having one end thereof connected to a cathode of the diode 317a, a smoothing capacitor 319a connected between the other end of the first smoothing resistor 318a and ground, a second smoothing resistor 320a connected between the other end of the first smoothing resistor 318a and the cathode of the diode 316a, and a transistor 321a having a base connected to the cathode of the diode 316a, an emitter connected to the collector of the second control transistor 304a and the base of the power transistor 306a, and a collector connected to one end of the first base-current supplying resistor 305a.

The control apparatus of the invention as constructed above operates as follows. When the key switch 5 is first turned on, the first control transistor 304a remains non-conductive due to the non-conduction of the first Zener diode 303a since the output voltage of the storage battery 4 is not so high as to make the Zener diode 303 conductive. At this time, however, the second Zener diode 313a is made conductive by the output voltage of the battery 4, so a current is supplied from the battery 4 to the base of the second control transistor 314a through the now conductive Zener diode 313a. As a result, the transistor 314a is turned on so that a current flows from the battery 4 to ground through the second base-current supplying resistor 315a and the now conductive transistor 314a. Thus, no base current is supplied from the battery 4 to the base of the transistor 321a through the resistor 315a. Until this time, sufficient output of the generator 1 is still not supplied to the base of the transistor 321a through a generator signal smoothing circuit which is constituted by the smoothing resistors 318a, 320a and the smoothing capacitor 319a. Therefore, the transistor 321a remains non-conductive, so the power transistor 306 is held non-conductive. In this manner, unlike the aforementioned known control apparatus of FIG. 2, the apparatus of the invention can positively prevent the supply of current from the battery 4 to the field coil 102.

Subsequently, when the starter switch 6 is turned on, the starter 7 is energized to operate by the battery 4 so that an unillustrated engine operatively connected to the starter 7 is thereby started. On this occasion, the output voltage of the discharging battery 4 decreases below a predetermined value corresponding to a threshold voltage for the Zener diode 313a, so that the Zener diode 313a and the transistor 314a are both made non-conductive. As a consequence, a current flows from the battery 4 to the base of the transistor 321a through the base-current supplying resistor 315a and the diode 316a, making it conductive. With the conduction of the transistor 321a, the power transistor 306a is also turned on so that a current is supplied from the battery 4 to the field coil 102. As the engine is started, the generator 1 begins to generate electrical power and a power generation signal in the form of an alternating current as well.

When the starting operation of the engine has finished, the starter switch 6 is automatically turned off to disconnect the battery 4 from the starter 7. Thereafter, the battery 4 is charged by the output voltage of the generator 1 to recover and raise its voltage. When the voltage of the battery 4 thus charged increases above a predetermined level, the transistor 314a again becomes conductive. At this time, however, a power generation signal in the form of an alternating current is supplied from the armature coil 101 of the generator 1 to the smoothing circuit comprising the diode 317a, the resistors 318a, 320a and the capacitor 319a, where it is smoothed and converted into a substantially constant direct current which is then supplied to the base of the transistor 321a, thus holding it conductive. As a result, the power transistor 306a is also held conductive.

Subsequently, when the output voltage of the generator 1 gradually increases above a predetermined level corresponding to the threshold voltage of the Zener diode 303a, the Zener diode 303a and hence the first control transistor 304a become conductive. As a result, the power transistor 306a is turned off so that the field current supplied from the battery 4 to the field coil 102 is decreased to reduce the output power of the generator 1.

On the other hand, even if the key switch 5 is inadvertently turned on, there is no current supply to the field coil 102 as long as the engine does not start to operate. In addition, when the engine stops operating, the generator 1 of course stops power generation or a power generation signal so that the transistor 321a is made non-conductive to turn off the power transistor 306a, thus cutting off the current supply to the field coil 102.

In this manner, according to the present invention, when the starter 7 begins to operate, a current is supplied to the field coil 102 only if the generates 1 generate electrical power or a power generation signal. In other words, the current supply to the field coil 102 is stopped when the generator 1 stops generating power or the power generation signal.

As described in the foregoing, according to the present invention, even if a driver inadvertently leaves a vehicle with the key switch 5 left on, or if the engine for driving the generator 1 stops for some reason while the driver is operating a vehicle on which the control apparatus of the invention is installed, the generator 1 no longer generates power or an output signal, whereby no current is supplied to the field coil 102 of the generator 1. As a result, the discharge of the battery 4 is substantially suppressed except for a limited amount of control current being supplied to the voltage regulator 3A. Thus, a so-called dead battery can be effectively prevented. In addition, even when the voltage regulator 3A is an air-cooled type in which the voltage regulator 3A is cooled by air produced by the rotation of the generator 1, there will be substantially no heat generation at the voltage regulator 3A and hence no thermal damage thereon since the field current is cut off due to the stoppage of the generator 1.

What is claimed is:

1. A control apparatus for an AC generator having an armature coil and a field coil, comprising:
   a rectifier connected to the generator for rectifying the output voltage thereof, said rectifier having input terminals connected to the armature coil, a ground terminal connected to ground, and an output terminal;
   a storage battery connected to the field coil of the generator for supplying a current to the field coil, said storage battery being also connected through said rectifier to the armature coil of the generator so as to be charged by the generator through said rectifier; and
   a voltage regulator connected between the generator and said storage battery for controlling the current supply from said storage battery to the field coil;
   said voltage regulator comprising:
   a) first circuit means including a semiconductor switch (306a) connected in series with the field coil between the output and ground terminals of said rectifier for controlling the current supply from said storage battery to the field coil;
   b) second circuit means connected between said first circuit means and said rectifier for controlling said first circuit means so that the output voltage of the generator is regulated to be at a first predetermined level;
   c) third, non-manual, voltage level responsive circuit means connected between said first circuit means and said storage battery for enabling the conduction of said first circuit means when the output voltage of said storage battery falls below a second predetermined level lower than said first predetermined level, such as just following an engine startup; and
   d) fourth, non-manual, voltage level responsive circuit means connected between the generator and said first circuit means for enabling the conduction of said first circuit means when the generator starts power generation, and before the third circuit means disables such conduction.

2. A control apparatus according to claim 1, wherein said semiconductor switch comprises a power transistor (306a) having a collector connected to one end of the field coil which has the other end thereof connected to said storage battery, an emitter connected to ground, and a base; and said first circuit further comprises a base-current supplying transistor (321a) having a collector connected through a first base-current supplying resistor (305a) and a key switch (5) to said storage battery, an emitter connected to the base of said power transistor, and a base connected to said storage battery through a diode (316a), a second base-current supplying resistor (315a) and said key switch.

3. A control apparatus according to claim 2, wherein said second circuit means comprises:

a first control transistor (304a) having a collector connected to the emitter of said base-current supplying transistor, an emitter connected to ground, and a base;

a pair of first serially connected voltage-dividing resistors (301a, 302a) having one end thereof connected to said storage battery and the other end thereof connected to ground; and a first Zener diode (303a) having a cathode connected to the base of said first control transistor and an anode connected to a junction between said pair of first serially connected voltage-dividing resistors.

4. A control apparatus according to claim 3, wherein said third circuit means comprises:

a second control transistor (314a) having a collector connected through said second base-current supplying resistor and said key switch to said storage battery, an emitter connected to ground, and a base;

a pair of second serially connected voltage-dividing resistors (311a, 312a) connected between said storage battery and ground; and a second Zener diode (313a) having a cathode connected to the base of said second control transistor and an anode connected to a junction between said pair of second serially connected voltage-dividing resistors.

5. A control apparatus according to claim 4, wherein said fourth circuit means comprises a smoothing circuit connected between the armature coil of the generator and the base of said base-current supplying transistor 312a for smoothing the output current of the armature coil and supplying it to the base of said base-current supplying transistor.

6. A control apparatus according to claim 5, wherein said smoothing circuit comprises:

a pair of serially connected resistors (318a, 320a) having one end thereof connected to the base of said base-current supplying transistor and the other end thereof connected through a diode (317a) to one of the input terminals of said rectifier; and a capacitor (319a) having one end thereof connected to a junction between said pair of serially connected resistors and the other end connected to ground.

7. A control apparatus according to claim 1, further comprising a starter connected through a starter switch to said battery for starting an engine operatively connected therewith.

* * * * *